United States Patent [19]

Ohlendorf et al.

[11] Patent Number: 5,484,511
[45] Date of Patent: Jan. 16, 1996

[54] PROCESS FOR THE REMOVAL OF IMPURITIES FROM HYDRAZINE HYDRATE

[75] Inventors: Wolfgang Ohlendorf, Leverkusen; Michael Batz, Leichlingen; Hans-Heinrich Moretto, Leverkusen; Peter Schmidt, Leverkusen; Gerhard Jonas, Leverkusen, all of Germany

[73] Assignee: Bayer Aktiengesellschaft, Leverkusen, Germany

[21] Appl. No.: 296,570

[22] Filed: Aug. 26, 1994

[30] Foreign Application Priority Data

Sep. 2, 1993 [DE] Germany .................. 43 29 599.1

[51] Int. Cl.$^6$ .................. B01D 3/10; C01B 21/16
[52] U.S. Cl. .................. 203/41; 203/47; 203/91; 203/100; 210/691; 210/692; 423/407
[58] Field of Search .................. 203/91, 41, 47, 203/100, DIG. 16; 210/691, 692, 694; 423/407; 568/383

[56] References Cited

U.S. PATENT DOCUMENTS

| | | | |
|---|---|---|---|
| 2,799,631 | 7/1957 | Van Hessart | 203/33 |
| 3,028,219 | 4/1962 | Rahlf et al. | 203/71 |
| 3,458,283 | 7/1969 | Meissner et al. | 423/408 |
| 3,740,436 | 6/1973 | Rigsby | 423/407 |
| 4,657,751 | 4/1987 | Alicot et al. | 423/407 |
| 4,963,232 | 10/1990 | Kuriyama et al. | 203/29 |

FOREIGN PATENT DOCUMENTS 0431998  6/1991  European Pat. Off. .

OTHER PUBLICATIONS

CA 115: 74 665.

*Primary Examiner*—Virginia Manoharan
*Attorney, Agent, or Firm*—William C. Gerstenzang; Sprung Horn Kramer & Woods

[57] ABSTRACT

A process for the removal of organic impurities and dissolved salts from hydrazine hydrate and aqueous solutions thereof by distillation of the hydrazine hydrate under reduced pressure, passing the hydrazine hydrate vapor through an adsorbent, and condensing the vapor.

7 Claims, No Drawings

PROCESS FOR THE REMOVAL OF IMPURITIES FROM HYDRAZINE HYDRATE

This invention relates to a process for the removal of organic impurities and dissolved salts from hydrazine hydrate and aqueous solutions thereof.

In the so-called ketone process which is generally used at the present time for the synthesis of hydrazine hydrate, ammonia is reacted with oxidizing agents, such as sodium hypochlorite or hydrogen peroxide, in aqueous solution in the presence of ketones, such as acetone or ethylmethyl ketone, to form the corresponding ketazine which is removed and then hydrolyzed. The hydrazine solution accumulating is generally concentrated to a hydrazine content of 64% by weight which corresponds to 100% hydrazine hydrate. From its production, the product produced in this way contains small quantities of organic secondary constituents and residues of chloride where chlorine bleach liquor was used as the oxidizing agent. The content of organic impurities in the hydrazine hydrate, normally characterized by the TOC (total organic carbon) value, is between 500 and 2000 ppm TOC for commercial qualities produced by the ketone process. The chloride content can assume values of up to 20 ppm.

Typical applications for hydrazine hydrate are the conditioning of steam circuits, the production of blowing agents, plant protection agents and many other chemicals. For applications such as these, it is often desirable further to reduce the impurity content.

It is known that salt-like impurities in hydrazine hydrate can be removed by adsorption onto ion exchanger resins. To this end, hydrazine hydrate is converted into the corresponding hydrazinium salt with a mineral acid and subsequently contacted with a strongly acidic cation exchanger (U.S. Pat. No. 3,458,283). A salt-free product is obtained by elution with the stoichiometric quantity of a strong base.

Disadvantages of this procedure lie in the additional need for acid and alkali and in the accumulation of salt during the regeneration of the cation exchanger.

A variant in which these disadvantages are alleviated by successively passing hydrazine hydrate over a strongly basic anion exchanger in the hydroxyl form and over a cation exchanger in the hydrazinium form is described in U.S. Pat. No. 3,740,436.

Unfortunately, neither of the processes mentioned above contributes towards reducing the content of organic impurities.

A process for the removal or organic impurities from hydrazine hydrate by percolation through polymeric adsorbents is described in U.S. Pat. No. 4,657,751. In this process, the TOC content in the hydrazine hydrate is reduced to values of 200 to 350 ppm. However, this process does not achieve a reduction in the chloride content so that further cost-incurring aftertreatment steps are necessary.

EP 294 100 describes a distillation-based process for the purification of hydrazine hydrate in the presence of a salt-containing auxiliary solution with which the TOC content can be reduced to values of 50 to 230 ppm. No figures are provided with respect to the salt content of the treated solution. The disadvantage of this process is on the one hand the extensive equipment involved, comprising two distillation columns of relatively high separation efficiency and the associated peripherals, and on the other hand the need to work up the auxiliary solution used. Again, no precise figures are provided as to energy consumption. However, those figures that are provided suggest that it is considerable.

Accordingly, the problem addressed by the present invention was to provide a process which would enable the content of impurities in hydrazine hydrate to be simply and inexpensively reduced, but which would not be attended by any of the disadvantages of known processes.

This problem has been solved by the process according to the invention.

The present invention relates to a process for the removal of organic secondary constituents and dissolved salts from hydrazine hydrate and aqueous solutions thereof, characterized in that the hydrazine hydrate or aqueous solutions thereof are distilled under reduced pressure, the hydrazine hydrate vapor is passed through a bed of an adsorbent and, after passing through the bed, is condensed and the adsorbent is optionally regenerated.

The hydrazine hydrate thus purified may then be put to further uses.

The hydrazine hydrate is preferably distilled under a pressure of 5 to 500 mbar. Pressures of 50 to 200 mbar are particularly advantageous, corresponding to a condensation temperature of 40° to 80° C.

In a particularly preferred embodiment, the distillation process is carried out with no reflux. With no reflux in the distillation process, energy consumption is minimal.

The adsorbent used is preferably selected from commercial adsorbent materials which show adequate mechanical, thermal and chemical stability under the working conditions. It is of particular advantage to use polymeric adsorber resins based on styrene/divinyl benzene, such as for example Bayer Lewatit® OC 1062.

The bed of adsorber resin is preferably in the form of a fixed bed or in the form of a fluidized or partly fluidized bed.

The adsorber material is preferably regenerated with the substances used in the hydrazine hydrate production process in a liquid or gaseous aggregate state, more particularly with acetone and/or water.

It has surprisingly been found that the TOC contents of 50 to 150 ppm achieved with the process according to the invention are far lower than in the prior art. The chloride content of around 0.2 ppm is also extremely low. The hydrazine hydrate can be purified simply, inexpensively and effectively by the process according to the invention.

The process according to the invention may be carried out both in batches and continuously.

The process according to the invention is illustrated by the following examples.

EXAMPLE 1

The hydrazine hydrate to be purified was distilled in a vacuum apparatus under a pressure of approximately 100 mbar. To this end, the gaseous hydrazine hydrate was passed through a double-walled column with a frit (length: 46 cm, internal diameter: 3 cm) of which the outer jacket was heated by thermostatically controlled water to around 70° C. to prevent condensation of the hydrazine hydrate vapor in the bed of adsorber resin. The adsorber resin used was Bayer Lewatit® OC 1062, a macroporous styrne/divinyl benzene copolymer with a particle size range of 0.2 to 0.8 mm, an average pore diameter of 110 A and a specific surface of 500 to 600 m²/g which had been washed with water beforehand. The height of the bed was approximately 32 cm. The hydrazine hydrate vapor leaving the upper end of the column was condensed in a descending condenser and delivered to a receiver. The hydrazine hydrate used was 100% hydrazine hydrate (2.11 kg) which had been obtained by oxidation of ammonia with chlorine bleach liquor in the presence of acetone and which contained 1250 ppm TOC and 9.2 ppm chloride.

A total of 2.08 kg of distillate with a TOC content of 130 ppm was obtained, corresponding to a reduction in the TOC value of around 90%. The chloride content was 0.2 ppm.

EXAMPLE 2

In the apparatus described in Example 1, another 2.3 kg of hydrazine hydrate (1700 ppm TOC, 10 ppm chloride) were distilled without regeneration or replacement of the adsorber material under the same conditions as in Example 1. An increase in the TOC content of the distillate from 150 ppm to 900 ppm was observed in the course of the distillation process, indicating that the capacity limit of the adsorber had been reached.

For regeneration, the adsorber resin was then thoroughly washed with water, acetone and again with water in that order and, finally, was dried. In the subsequent distillation of more hydrazine hydrate through a bed of the regenerated adsorber resin, a distillate containing 150 ppm TOC and 0.1 ppm chloride was obtained under the conditions described in Example 1.

It will be understood that the specification and examples are illustrative but not limitative of the present invention and that other embodiments within the spirit and scope of the invention will suggest themselves to those skilled in the art.

We claim:

1. A process for the removal of organic secondary constituents and dissolved salts from hydrazine hydrate and aqueous solutions thereof to obtain hydrazine hydrate with a TOC content of 50 to 150 ppm and a chloride content of about 0.2 ppm, which consists of distilling under reduced pressure hydrazine hydrate or an aqueous solution thereof, passing the resulting hydrazine hydrate vapor through a bed of an adsorbent and, after passing through the bed, condensing the vapor in order to obtain hydrazine hydrate with a TOC content of 50 to 150 ppm and a chloride content of about 0.2 ppm, and regenerating the adsorbent.

2. A process according to claim 1, wherein the distillation is carried out under a pressure of 5 to 500 mbar and at a condensation temperature of 40° to 80° C.

3. A process according to claim 1, wherein the distillation process is carried out with no reflux.

4. A process according to claim 3, wherein the distillation is carried out under a pressure of 5 to 500 mbar and at a condensation temperature of 40° to 80° C., wherein the adsorbent is a resin based on styrene-divinyl benzene, and the adsorbent is regenerated with acetone, water or a solution of acetone in water.

5. A process according to claim 1, wherein the adsorbent is a resin based on styrene-divinyl benzene.

6. A process according to claim 1, wherein said regeneration is accomplished with a substance used in the production of the hydrazine hydrate, said regenerating substance being in a liquid or gaseous state.

7. A process according to claim 1, wherein the adsorbent is regenerated with acetone, water or a solution of acetone in water.

\* \* \* \* \*